United States Patent Office 3,046,145
Patented July 24, 1962

3,046,145
PROCESS FOR PREPARING A PRECOOKED DEHYDRATED SWEET POTATO PRODUCT
Harold J. Deobald, Metairie, La., and Taylor A. McLemore, Taylorsville, Miss., assignors to the United States of America as represented by the Secretary of Agriculture
No Drawing. Filed Apr. 7, 1961, Ser. No. 101,598
1 Claim. (Cl. 99—207)
(Granted under Title 35, U.S. Code (1952), sec. 266)

A nonexclusive, irrevocable, royalty-free license in the invention herein described, throughout the world for all purposes of the United States Government, with the power to grant sublicenses for such purposes, is hereby granted to the Government of the United States of America.

This invention relates to the preservation of sweet potatoes and has as its objective the preparation of a precooked dehydrated sweet potato product. Other objectives of this invention are the preparation of a dehydrated sweet potato product that retains the color, nutritional, and the flavor characteristics of sweet potatoes. The dried product may be consumed as is, as a confection, or the product may be reconstituted instantly by the addition of hot water to form a cooked sweet potato puree useful for pie fillings, puddings, baby foods, candy filling, and the like. Still another objective of this invention is the preparation of a dehydrated sweet potato product that is thermoplastic and can be molded while hot and formed into convenient shapes (e.g. bars, pellets, and so forth).

It is well known to preserve natural food products and particularly vegetable feed products by processes of dehydration and the operations of dehydration involved in the process that is the subject of this invention are similar in most respects to those several basic systems established for other vegetable food products (white potatoes, for example). Sweet potatoes are, however, unique in certain respects. The carbohydrate content and the carotenoid content of sweet potatoes is very high in comparison to other vegetable products. Because of its unusual characteristics, modifications in dehydration and subsequent storage operations as conventionally practiced for vegetable products are required. For example, the typical processes of dehydration applicable to white potatoes require that considerable care be exercised so that "cell damage" will be held to an absolute minimum while the white potato is undergoing the mechanical process of particle size reduction (dicing, slicing, etc.). The comminution of sweet potatoes prior to dehydration, on the other hand, may be carried out with no precautions whatsoever with respect to cell damage. Indeed, the essentially complete rupture of the starch cells of the sweet potato during comminution is most desirable in the process herein described. In contrast to the white potato, the successful processing of the sweet potato requires a most careful enzymatic control in order to forestall flavor deterioration and/or discoloration in the dehydrated product.

Microscopic examination of a water suspension of the dried sweet potato product shows that the greatest proportion of starch cells is quite empty. This is quite in line with our observation above that cell damage during comminution incident to processing is of no consequence and may, as a matter of fact, be beneficial. Microscopic examination of a water suspension of the dehydrated sweet potato product using polarized light, shows small amouns of starch remaining within the granular walls. This starch, however, has been gelatinized as a result of thermal processing.

During processing, a significant proportion of the starch is hydrolyzed to sugar. This fact has been established by chemical analysis. Total sugar increases more than two fold in the sweet potato product as a result of the processing herein described. We believe that if the conversion of starch to sugar was complete in our process, the material could not be dried successfully. However, as a result of the gelatinization of small quantities of starch that remain unhydrolyzed, it is possible to attain a coherent product that can be successfully dried by conventional methods (drying rolls or drums). If, on the other hand, all of the starch was gelatinized and complete cell rupture took place, without subsequent hydrolysis of the bulk of the starch to sugar, we believe that the dehydrated sweet potato product would "case harden" and make rehydration of the dehydrated product difficult, if not impossible.

In carrying out the process of the invention, peeled and trimmed sweet potatoes are cooked in the presence of moisture for a period of from 20 to 35 minutes at a temperture of about 212° F. The cooked sweet potatoes are then mixed with a sufficient amount of water to produce a mixture having a solids content of about from 18% to 25%, and the sweet potatoes in the mixture then comminuted to essentially completely rupture the sweet potato starch cells producing a puree of solids content within the said range of 18% to 25%. The pureed sweet potato product is then dehydrated to a moisture content of less than 6%, preferably about from 2% to 4%, by weight, and the resulting dehydrated sweet potato product thereafter packaged in a gas tight container with an inert gas, such as nitrogen, the oxygen content of which inert gas amounts to less than 3%, preferably to less than 2%. The dehydrated sweet potato product, produced as described above, is characterized in that it retains the color, nutritional, and flavor characteristics of sweet potatoes, is amenable to long term storage without deterioration, and is capable of instant rehydration to form a cooked sweet potato puree.

The difficulties that accompany the dehydration and storage of natural food products which possess a high carotene content are well known in the art. Carrots, as an example, are known to be exceedingly difficult to dehydrate and to store successfully. It is believed that at least one reason for the aforementioned difficulties is the fact that carotenoid pigments contain unsaturation and hence are unstable in the presence of oxygen. That this may be the case is supported by our discovery that sweet potatoes can be successfully dehydrated and stored only when processed according to our recommended procedure, packaged and stored in airtight containers at inordinately low levels of oxygen content. As Tables I and II in the following example will demonstrate, oxygen content within the storage container must be less than 3% and preferably less than 2% in order to assure the successful storage of the dehydrated product.

EXAMPLE 1

*Raw Sweet Potato Analysis—1958–59 Season*

GOLDRUSH

| Moisture, Percent | β-Carotene, p.p.m. | Ascorbic Acid, Mg./ 100 g. | Sugars | |
|---|---|---|---|---|
| | | | Reducing, Percent | Total, Percent |
| 47.6 | 460 | 86 | 5.7 | 26.2 |
| 75.7 | 460 | 83 | 7.0 | 22.8 |
| 74.8 | 407 | 86 | 5.1 | 24.3 |
| 76.6 | 405 | 80 | 6.5 | 22.9 |
| 76.1 | 431 | 85 | 7.75 | 30.8 |

The sweet potatoes were washed, preheated in water at 160° F. for 30 minutes, peeled by immersion in approximately 20% by weight aqueous caustic solution heated to 220° F. and subsequent passage through a rotary peeler and washer, and finally trimmed to remove fibrous ends, scar tissue, and other unwanted material. The peeled and trimmed sweet potatoes were then precooked for 25 minutes at 212° F. Water was added to the peeled and cooked sweet potatoes in an amount sufficient to adjust the solids content of the mixture to approximately 18–25%. The added water contained sodium bisulfite and sodium sulfite in an amount equivalent to 0.02 gram of sodium bisulfite and 0.06 gram of sodium sulfite per pound of potatoes to prevent discoloration. The mixture of peeled and cooked sweet potatoes and sodium bisulfite-sodium sulfite containing water was then made into a puree by comminuting in a commercial type beater-mixer. The pureed sweet potato material was fed to a double drum dryer, the rollers of which were internally heated with steam at approximately 75 pounds per square inch gage pressure. (Temperature of the drier roll surface under these conditions is approximately 300° F.) Spacing between the drier rolls was held between the limits of .007 and .010 inch. Roll speeds were adjusted so that residence time of the sweet potato material on the drying rolls was approximately 17 seconds. These operating conditions produced a dried sweet potato product containing from 2 to 4% moisture and a product the physical appearance of which was a more or less intact sheet. The dried sweet potato sheet was removed from the drum drier by a "doctor blade," and packaged immediately in air- and moisture-tight containers in an atmosphere of nitrogen.

We have found it necessary, because of varietal differences in sweet potato, to make some adjustment of the solids content prior to preparation of the puree. However, the extreme range of solids content has been found to extend from 18 and 25%. Adjustment of the solids content subsequent to preparation of the puree is best accomplished by visual inspection. A free flowing, but not visually watery puree, is desired for drying.

Drying temperature and residence time of the puree on the drying rolls is critical. Excessively high steam pressures (120 p.s.i. or more) within the rolls and residence time greatly in excess of 17 seconds tend to give rise to the production at a darkened and over-baked flavored product. Drying temperatures of 300° and a roll residence times of 17 seconds are preferable but residence time and temperature being interrelated, it is possible for the operator to adjust either to suit the material being processed. In general, increasing the temperature of the drying rolls would require shortening of the residence time.

The temperature of the dehydrated sweet potato product during the forming step is likewise critical. The dehydrated sweet potato material removed from the drying rolls by the "doctor blade" is at a temperature high enough for the product to exhibit plastic characteristics.

The sugar content of the dried material immediately after removal from the rolls averages close to 40% by weight. Softened by heat, this predominately carbohydrate material is quite thermoplastic and can if desired be easily formed.

Alternatively, the dehydrated material from the drying rolls may be allowed to cool somewhat following which cooling, the thin sheets of dehydrated product may be easily reduced to flake or powder form. The dehydrated sweet potato product is immediately usable in the dried flake or powder form, but for deferred use the dehydrated product must be packaged in containers that are impervious to both air and moisture. The oxygen content within the sealed container must preferably be about 2% and in no case should the oxygen content of the sealed storage container exceed 3%.

Packaging of the dehydrated material in gas and moisture impervious containers is essential for preserving the product. Such packaging is necessary because of the susceptibility of the product to oxidation. The dehydrated product, if exposed to the atmosphere after cooling, takes up moisture and becomes gummy.

TABLE I

*Flavor Evaluation of Stored Sweet Potato Flakes, Storage at 70° F. in Sealed Containers (Material Stored Under Various Levels of Oxygen)*

| Percent Oxygen in Storage Container | Time in Storage | | | | | |
|---|---|---|---|---|---|---|
| | 30 days | 60 days | 90 days | 6 mos. | 10 mos. | 14 mos. |
| 1.5 | OK | OK | OK | OK | OK | OK. |
| 1.5 [1] | OK | OK | OK | OK | OK | OK. |
| 3.0 | OK | OK | OK | OK | Off | |
| 3.0 [1] | OK | OK | OK | OK | OK | |
| 6.0 | OK | OK | Off | | | |
| 6.0 [1] | OK | OK | OK | Off | | |
| 10.0 | Off | | | | | |
| 10.0 [1] | OK | Flavor Marginal. | Off | | | |
| Atmospheric Oxygen Level (20.7). | Off flavor. | | | | | |
| Atmospheric Oxygen Level (20.7). [1] | Off flavor. | | | | | |

[1] A commercial antioxidant (0.1% on a dry solids basis) added.

TABLE II

*Carotene Content [1] of Sweet Potato Flakes, Storage at 70° F. in Sealed Containers, Effect of Levels of Oxygen and Antioxidant*

| Percent Oxygen in Storage Gas | Anti-Oxidant | Storage Time | | | | |
|---|---|---|---|---|---|---|
| | | 30 days | 60 days | 90 days | 7 mos. | 10 mos. |
| 1.5 | None | 522 | 500 | 512 | 470 | 517 |
| 1.5 | + | 537 | 517 | 531 | 497 | 483 |
| 3.0 | None | 516 | 496 | 466 | 447 | 488 |
| 3.0 | + | 537 | 517 | 510 | 467 | 470 |
| 6.0 | None | 463 | 418 | 453 | 364 | 449 |
| 6.0 | + | 531 | 504 | 485 | 428 | 431 |
| 10.0 | None | 431 | 411 | 444 | 383 | 417 |
| 10.0 | + | 537 | 507 | 471 | 418 | 386 |
| Air | None | 411 | 379 | 401 | 376 | 391 |
| Air | + | 485 | 458 | 419 | 391 | 373 |

[1] Parts per million dry basis.

The product of this invention may be consumed as is as a confection or the product may be reconstituted with hot water, milk, or a water-milk mixture. For purposes of reconstitution, the liquid is added in a ratio of approximately three parts by weight to approximately one part by weight of dehydrated product. Temperature of the water for reconstitution should be between 170° F. and boiling in order to effect immediate reconstitution. However, it will reconstitute even in ice water. The dehydrated material will rehydrate in less than 30 seconds.

A dehydrated sweet potato product prepared according to the process described above exhibited the following characteristics:

*Dry Flakes*

| Moisture, Percent | β-Carotene, p.p.m. | Ascorbic Acid, Mg./100 g. | Sugars | |
|---|---|---|---|---|
| | | | Reducing, Percent | Total, Percent |
| 3.99 | 500 | 85 | 21.0 | 38.8 |
| 3.48 | 566 | 84.7 | 19.8 | 37.5 |
| 3.53 | 500 | 94.0 | 20.4 | 38.7 |
| 3.64 | 503 | 92.0 | 20.2 | 39.4 |

We claim:

A process of preparing a pre-cooked dehydrated sweet potato product that retains the color, nutritional, and flavor characteristics of sweet potatoes, is amenable to long term storage without deterioration, and is capable of instant rehydration to form a cooked sweet potato puree, comprising the following sequential operations:

(a) Cooking peeled and trimmed sweet potatoes in the presence of moisture for a period of from 20 to 35 minutes at a temperature of about 212° F.;

(b) Mixing the cooked sweet potatoes with a sufficient amount of water to produce a mixture having a solids content of about from 18% to 25% and comminuting the sweet potatoes in said mixture to essentially completely rupture the sweet potato starch cells producing a puree of said solids content;

(c) Dehydrating of the pureed sweet potato product to a moisture content of less than 6% by weight; and (d) Packaging the dehydrated sweet potato product in gas tight containers with an inert gas, the oxygen content of which inert gas amounts to less than 3%.

References Cited in the file of this patent

UNITED STATES PATENTS 1,571,945   Heimerdinger _____ Feb. 9, 1926

OTHER REFERENCES

Talburt: "Potato Processing," pages 332–341, April 23, 1959.

UNITED STATES PATENT OFFICE
CERTIFICATE OF CORRECTION

Patent No. 3,046,145            July 24, 1962

Harold J. Deobald et al.

It is hereby certified that error appears in the above numbered patent requiring correction and that the said Letters Patent should read as corrected below.

Column 2, in the table, under the heading "Moisture Percent", line 1 thereof, for "47.6" read -- 74.6 --.

Signed and sealed this 5th day of March 1963.

(SEAL)
Attest:

ESTON G. JOHNSON
Attesting Officer

DAVID L. LADD
Commissioner of Patents